Jan. 20, 1970   H. WEBERS ET AL   3,490,612
DEVICE FOR REVERSING CONCRETE REINFORCING STEEL MATS
Filed Jan. 15, 1968   3 Sheets-Sheet 1

INVENTORS
Heinz WEBERS
Werner VERWEY
By

KARL RATH their ATTORNEY

INVENTORS
Heinz WEBERS
Werner VERWEY
By

KARL RATH their ATTORNEY

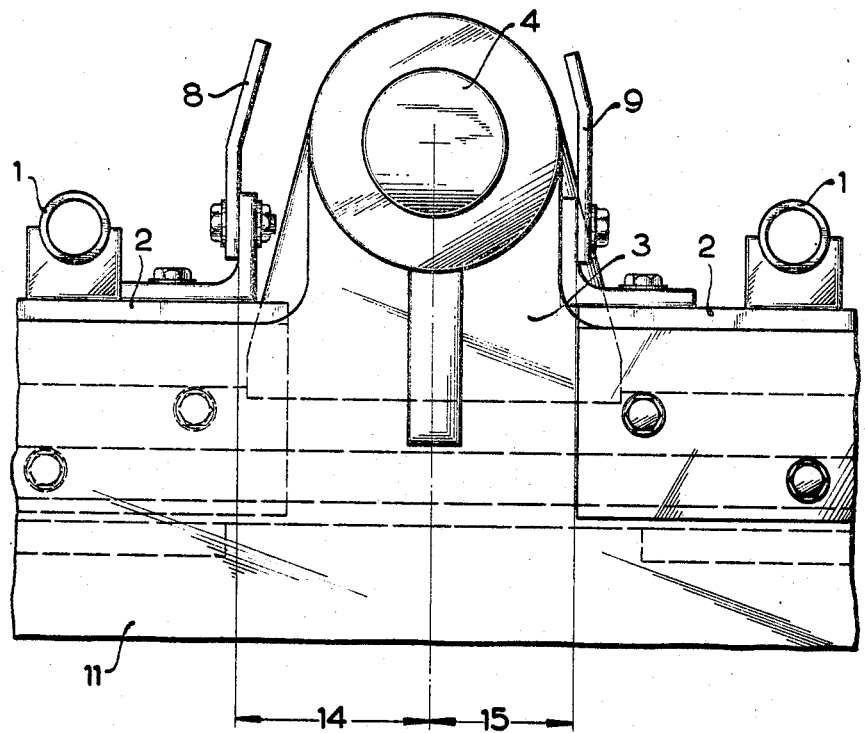

United States Patent Office 3,490,612
Patented Jan. 20, 1970

3,490,612
DEVICE FOR REVERSING CONCRETE REINFORCING STEEL MATS
Heinz Webers, Osterath, and Werner Verwey, Oberhausen-Osterfeld, Germany, assignors to Bau-Stahlgewebe G.m.b.H., Dusseldorf - Oberkassel, Germany, a corporation of Germany
Filed Jan. 15, 1968, Ser. No. 697,884
Claims priority, application Germany, Jan. 13, 1967, B 90,737
Int. Cl. B65g 57/16; B25j 3/00
U.S. Cl. 214—6                                8 Claims

ABSTRACT OF THE DISCLOSURE

Apparatus for the stacking in relatively reversed position of a pair of concrete reinforcing steel mats comprises a pair of juxtaposed planar supports disposed in a common plane in the normal position with means for the feeding thereto of a pair of mats to be stacked. Both supports are rotatively mounted about a common axis and fitted with drive means to simultaneously rotate the same towards and away from another at different angular velocities, whereby the mat upon the support having the greater angular velocity is transferred to and stacked upon the other mat in relatively reversed position by first rotating the supports towards one another into a transfer position of engagement of the mats supported thereby, and thereafter returning the supports to their normal position, respectively.

---

The present invention relates to apparatus for the stacking in relatively reversed position of a pair of concrete reinforcing mats of the type consisting of a set of spaced and parallel longitudinal bars intersected by a set of spaced and parallel transverse bars, said sets being connected with one another, preferably by spot welding, at the intersection points of the bars, to provide a grid or mat structure suitable for embedment as reinforcing means in a flat concrete structure or slab, such as floors, walls, etc.

It is customary in the fabrication of reinforcing steel mats of the foregoing type to utilize multiple or grid welding devices traversed continuously by the longitudinal bars or wires supplied from a roll with the transverse bars being fed and connected intermittently to said longitudinal bars by spot welding by the aid of a common welding electrode extending across the entire width of the set of longitudinal bars, whereby to result in a continuous strip-like mat structure being subsequently cut into appropriate lengths or units by the aid of a suitable cutting device. In other words, the welding device serves to simultaneously weld the single transverse bars to all the longitudinal bars in a continuous production line run or operation.

In stackpiling reinforcing mats produced in the foregoing or any other manner by stacking a number of mats upon each other, it is customary to reverse or turn over every second or alternate mat of the stack by 180° in the interest of reducing storage and/or shipping space. As a consequence, a stack of this type contains in each layer or vertical plane of bars two sets of bars of equal type, that is, either longitudinal or transverse, whereby to enable a saving of mounting space or height of the stack of as much as 45%, compared with a stack of an equal number of mats with all the mats oriented in the same vertical direction as to their longitudinal and transverse bars, respectively. In other words, in the improved stacking arrangement the relative vertical orientation of the bars is reversed alternately from one mat to the next within the stack, compared with a constant or uniform orientation throughout a stack directly obtained from an ordinary production line, or without the use of any reversing means.

There is already known apparatus, as shown for instance by German Patent 1,171,864, for the reversing of alternate mats supplied by a single production line, said apparatus utilizing reversing or turnover arms of the type known in conjunction with rolling mill trains in cooperation with a vertical and partially curved slide mechanism disposed on one side of the horizontal support holding a mat to be reversed.

It is furthermore known, in accordance with existing trends of rationalization of the fabrication of concrete reinforcing mats, to utilize a welding bar or electrode of increased length straddling a pair of juxtaposed continuous mats produced by a twin production line or operation. Such methods of fabrication make it necessary, after simultaneous cutting of the mats produced, to reverse the alternate mats of each line separately, in the effort to reduce storage and shipping space in the manner pointed out herein. In other words, a separate turnover or reversing arrangement is required for each of the production lines.

Besides, it is known, in conjunction with rolling mill operations and shown for instance by U.S. Patent 2,271,-213, to manipulate a flat rolled part or workpiece by means of a pair of turnover arms moving at different angular velocities, in such a manner as to reverse the workpiece by 180°. Arrangements of this and similar type operating upon a single workpiece are extremely bulky as well as costly, due both to the weight of the workpieces involved, their physical (red hot) condition, as well as other causes well known. This has made it necessary to actuate each of the turnover arms by a separate drive, or to rotate the same through separate axes, to provide for the necessary transmission ratios and space required for feeding the workpieces, where a common drive is used for both turnover arms.

Accordingly, an important object of the present invention is the provision of reversing apparatus for the turning over of steel mats of the referred to type by 180°, which apparatus is both simple in design and construction, as well as reliable and expeditious in use and operation.

A more specific object of the invention is the provision of apparatus for both relatively reversing a pair of steel mats of the referred to type, supplied for instance from a continuous twin production line, and simultaneously superposing or stacking said mats, to result in a minimum of stacking height in conjunction with other pairs of mats similarly produced.

Yet another object of the invention is to stack and relatively reverse the mats supplied by a pair of continuous twin production lines, to form a single line comprising units of pairs of stacked and reversed mats.

The invention, both as to the foregoing and ancillary objects as well as novel aspects thereof, will be better understood from the following description, taken in reference to the accompanying drawings forming part of this specification and in which;

FIG. 5 is a fragmentary view on a larger scale, more clearly showing part A of FIG. 1.

Like reference numerals denote like parts throughout the different views of the drawings.

With the foregoing objects in view, the invention involves generally the provision of apparatus for the simultaneous relative reversing and stacking of pairs of juxtaposed reinforcing mat units or the like, to result in pairs of stacked and relatively reversed units which may in turn be assembled into a greater stack of desired height for storage and/or shipment. The simultaneous reversal and stacking of two mats at a time makes it possible to construct reversing apparatus being both relatively simple in design and construction as well as capable of operation reliably and expeditiously, as will become apparent as the description proceeds in reference to the drawings.

Composite reversing and stacking apparatus according to the invention is suited especially, though not limitatively, for use in conjunction with twin production line operations, involving the fabrication of a pair of juxtaposed continuous strip-like reinforcing mats by the aid of a common multiple or grid welding device and subsequent severing of the mat strips by means of a single cutting device or mechanism. There are provided in this manner pairs of juxtaposed mat units being fed to the reversing and stacking apparatus forming the subject of the invention and described in the following.

Briefly, the reversing apparatus according to the invention comprises essentially a pair of planar juxtaposed supports to which are fed the pairs of mats from the welding and cutting mechanism, said supports each serving to hold one of the mats and being rotatable about a common central axis towards and away from one another at different angular rotating speeds, in such a manner as to effect both a superposition and relative reversal of the mats by first rotating the supports and mats held thereby towards one another to a transfer position of engagement of said mats, to effect a reversal and transfer of one mat to the other, and by subsequently returning said supports to their normal or starting position. As a consequence, the two mats are stacked in relatively reversed position upon the support of lesser angular velocity, for further use or stacking with other pairs of mats similarly produced, to result in a desired final composite stack of reduced storing space or height, in the manner described and pointed out.

Viewed from a different angle, the invention involves the transition or conversion of a pair of juxtaposed or twin production lines, comprised of single mats each, into a single line comprised of pairs of superposed and relatively reversed mat units.

Figure 1:
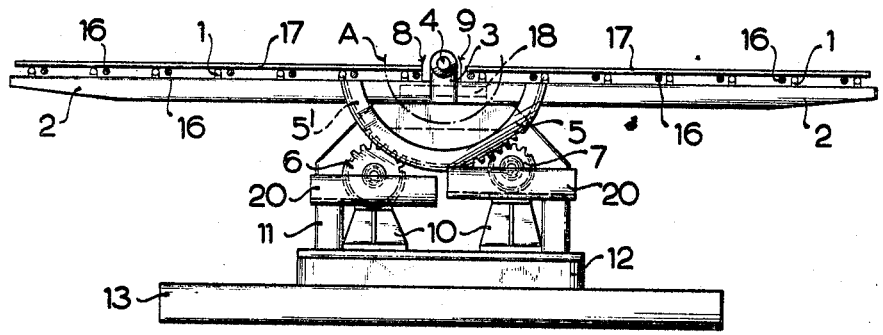
FIG. 1 is a front elevational view of stacking and reversing apparatus constructed in accordance with the principles of the invention, said apparatus being shown with a pair of mats in the normal or starting position, or position prior to the commencement of a reversing and stacking operation.

Referring more particularly to the drawings, FIG. 1, the stacking and reversing apparatus shown may be disposed at the end of a twin production line of the type described, to feed a pair of juxtaposed and equal mat units, each being comprised of sets of longitudinal bars 16 and transverse bars 17 connected to the former by spot welding in the manner described. Alternatively, the two juxtaposed mats denoted by equal reference numerals 16, 17 may be fed or supplied to the reversing and stacking apparatus in any other suitable manner, the type of feeding or mounting of the mats being immaterial as far as the stacking and reversing operations are concerned.

The stacking and reversing apparatus shown comprises a pair of juxtaposed planar supports or frames disposed in a common plane in the normal or starting position, FIG. 1, and comprised each of sets of longitudinal arms 1 parallel to the longitudinal bars 16 of the mats which are advantageously applied with the longitudinal bars of both the mats and supports lying in a single plane, as shown in the drawing, said supports further comprising a pair of parallel cross arms or beams 2 connected to the arms or bars 1. Both supports 1, 2 of the device are rotatively mounted about a common central axis by the provision of brackets 3 supported by the arms 2 and pivot pins or axes 4. Upright 11 serves to support the adjoining or inner parts of the arms 2 and is in turn supported by a frame 12 mounted upon the base 13 of the device.

Figure 4:
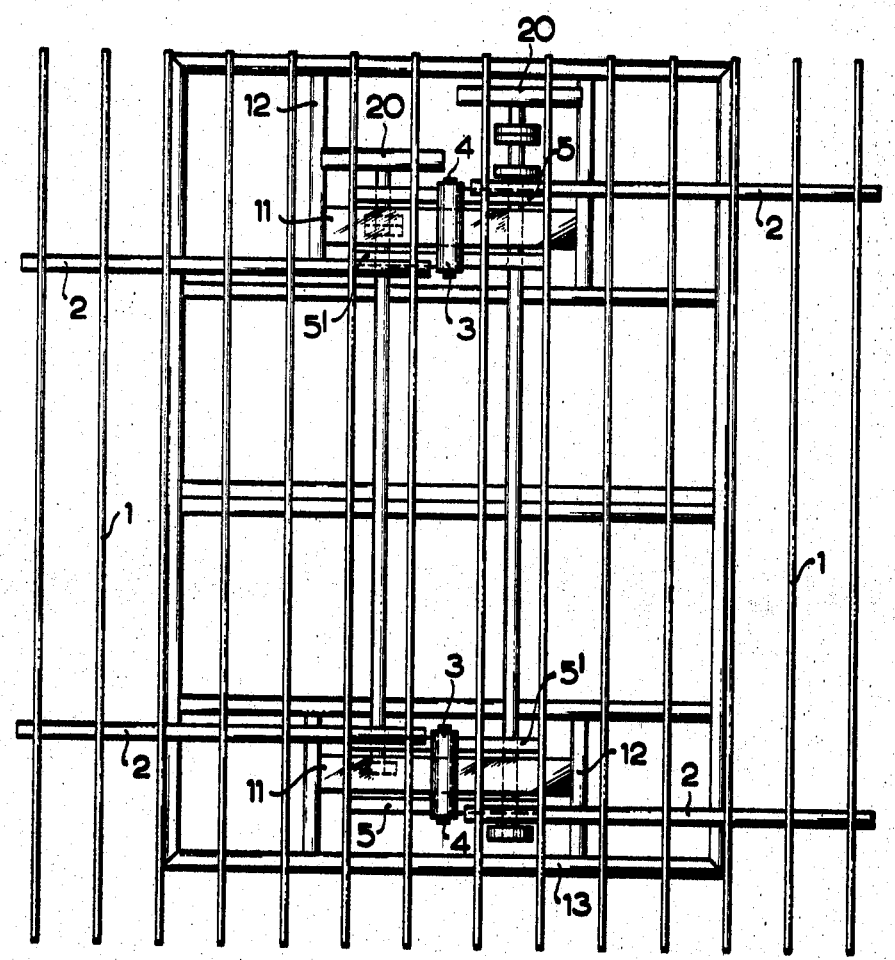
FIG. 4 is a plan view of FIG. 1 shown without the mats in position.

In the example shown (see also FIG. 4) the brackets 3 form a pair of hinge joints in conjunction with freely supported pivot pins 4. If desired, the latter may be fixedly supported or connected to the upright 11.

Rotation of the supports 1, 2, each holding a mat 16, 17, towards and away from another about their common axis 4 is effected, in the example shown, by pairs 5, 5' of segmental toothed racks being affixed to the cross arms 2 of each support, respectively, the racks of each support being concentric with the axis 4 and driven by one of a pair of pinions 6 and 7 having different effective diameters and supported by bearings or brackets 10. As a consequence, the supports 1, 2, upon driving the pinions 6 and 7 in unison by a suitable source, are rotated at different angular velocities, that is, with the support holding the mat to be reversed and transferred having the greater velocity than the support receiving the reversed and stacked mats having the lesser velocity, respectively.

Figure 2:
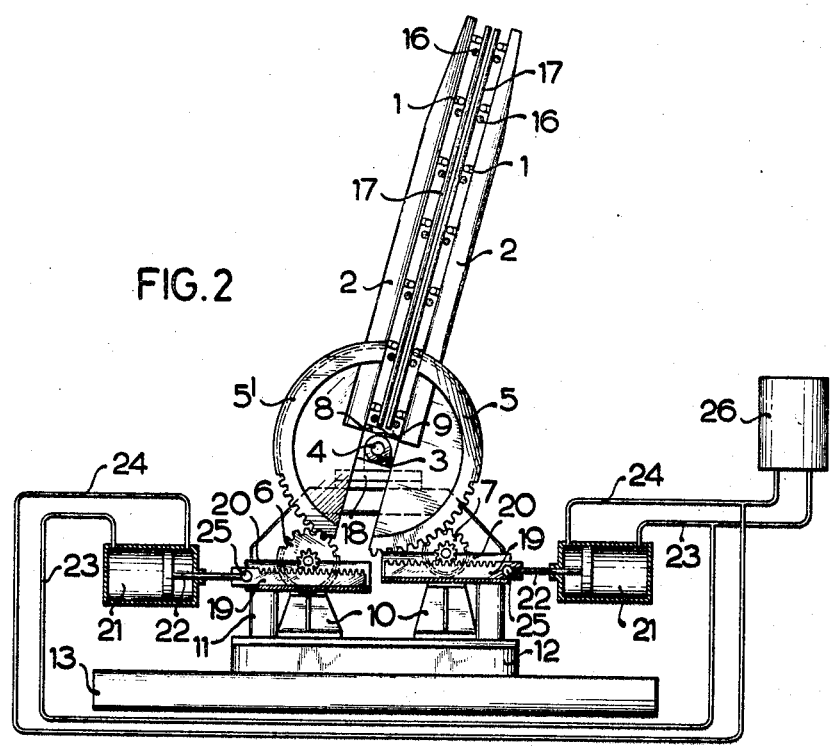
FIG. 2 shows the apparatus of FIG. 1 in the operative or transfer position, or position of engagement and stacking of the mats in relatively reversed position.

The common drive for the segmental racks 5 and 5', shown by way of example in FIG. 2, comprises a pair of straight racks 19 moving within guides 20 and driving the pinions 6 and 7, respectively. Translatory movement of the racks 19 is effected by connection thereof, through suitable swivel joints 25, with the piston rods 22 of a pair of similar pneumatic or hydraulic actuators having cylinders 21 and connected each, through pairs of feed lines 23 and 24, to a common fluid source under pressure and control device 26. As a consequence, application of fluid pressure to either of the two chambers of the cylinders provided by the movable pistons makes it possible to operate the device through the positions of FIGS. 1, 2 and 3, for the stacking and relatively reversing of a pair of mats or the like grid structures.

As will be understood, any suitable synchronous drive, to rotate the pinions 6 and 7 at equal angular velocity, such electric synchronous motors may be utilized for carrying into effect the invention.

The supporting surfaces provided by the transverse supporting arms or bars 2 are limited in the direction of the rotating axis 4 by the provision of resilient abutment strips 8 and 9 affixed to said arms, respectively, said strips serving, among others, to prevent sliding of the mats 16, 17 during rotation of the supports from the starting position, FIG. 1, to the transfer position, or position of engagement of the mats, FIG. 2. More particularly, the distance 14, FIG. 5, of the strip 8 from the axis 4, that is, of the strip associated with the (left-hand) support having a greater angular velocity, exceeds the distance 15 of the strip 9 associated with the (right-hand) support having a lesser angular velocity, respectively. Both strips 8 and 9 advantageously consist of bent angular metal sheets, whereby to resiliently engage and lock with one another in the meeting or transfer position of the supports, FIG. 2, thereby to ensure a safe and reliable transfer of the left-hand mat 16, 17 to the right-hand mat 16, 17, in the example illustrated.

According to a preferred design of the device described a simultaneous rotation of the pinions 6 and 7 and segments 5 and 5', respectively, results in the left-hand support 1, 2 being rotated through an angle of about 105° due to its greater angular velocity, that is, resulting in the right-hand support 1, 2 being rotated through 75° to the meeting or transfer position of the supports, FIG. 2. As a consequence, the mats 16, 17 are superposed with the transverse bars 17 of both mats lying in a common plane, or with the left-hand mat reversed or turned over by 180°, compared with the right-hand mat, respectively. Upon the subsequent rotation of the supports in the opposite direction, or return to the starting or initial position, both mats 16, 17 overlie the right-hand support in stacked and relatively reversed position, FIG. 3, from which they may be removed or withdrawn, to be combined into greater stacks of minimum height for storage and/or shipment.

Figure 3:
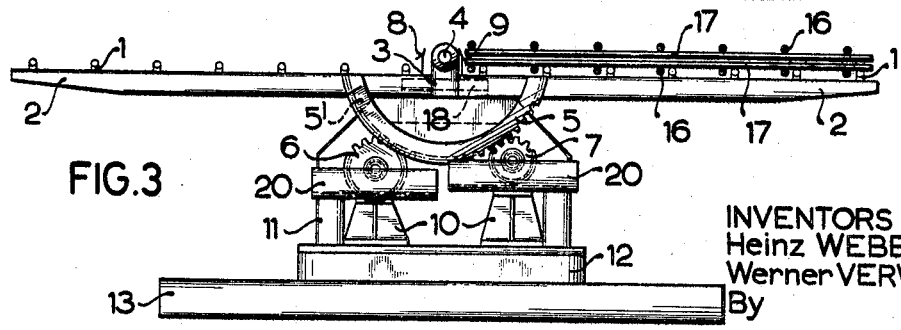
FIG. 3 shows the same apparatus upon return to its normal position, with the mats stacked and reversed for withdrawal and further stacking.

In FIG. 3, the transverse bars 17 of the mats are shown somewhat drawn apart for clearer illustration, it being understood that they may be positioned in the same plane as a result of the relative reversal of the mats, compared with their FIG. 1 positions.

In the example shown, the rotating supports consist of the cross arms 2 to which are connected the longitudinal arms or bars 1. According to a modified arrangement, only the cross arms 2 may be rotated by the pinions 6 and 7 and racks 5 and 5', while the longitudinal arms 1 are stationary and provided with suitable interruptions to allow of free and unobstructed passage of the arms 2. Alternatively, any equivalent support or mounting platform and holding devices may be used to hold the mats 16, 17 to be stacked and reversed. As an example, the mats may be supported by electromagnets mounted upon the arms 2 or other supports, suitable switching means being provided to suspend the magnetic holding force or forces during transfer of one mat to the other, in the stacking position, FIG. 2.

In the foregoing the invention has been described in reference to a specific exemplary device. It will be evident, however, that variations and modifications, as well as the substitution of equivalent parts or elements for those shown for illustration, may be made without departing from the broader scope and spirit of the invention. The specification and drawings are accordingly to be regarded in an illustrative rather than in a restrictive sense.

We claim:

1. Apparatus for stacking in relatively reversed position a pair of concrete reinforcing steel mats each consisting of a set of spaced longitudinal bars intersected by and connected to a set of spaced transverse bars, comprising in combination:
    (1) a first planar support,
    (2) a second support similar and disposed in juxtaposed relation to said first support with both supports located in a common plane in the normal position, for the feeding thereto of a pair of mats to be stacked,
    (3) means rotatively connecting the adjoining edges of said supports about a common central axis,
    (4) first and second segmental toothed racks concentric with said axis and respectively affixed to said first and second supports,
    (5) first and second driving pinions each meshing with one of said racks,
    (6) a common driving source to rotate said pinions at equal angular speeds,
    (7) the cooperating racks and pinions being arranged and having motion transmitting ratios, to effect simultaneous rotation of said supports by said source towards and away from one another and at an angular speed of said first support being in excess of the angular speed of said second support,
    (8) whereby to enable transfer of the mat upon said first support and stacking thereof in reversed relation on the mat upon said second support by first rotating said supports by said source towards one another from said normal position to a transfer position of engagement of said supports and the mats thereon and subsequently rotating said supports by said source in the opposite direction to said normal position.

2. Stacking and reversing apparatus as claimed in claim 1, said mats in the feeding position being disposed with their longitudial and transverse bars oriented in the same vertical direction, to result in opposite orientations of the mats in the stacked position.

3. Stacking and reversing apparatus as claimed in claim 1, each of said supports comprising a pair of spaced and parallel supporting arms disposed at right angle to said axis.

4. Stacking and reversing apparatus as claimed in claim 3, including sets of spaced and parallel supporting bars intersecting and connected to said supporting arms.

5. Stacking and reversing apparatus as claimed in claim 1, including resilient abutments extending at right angles from said supports adjoining the rotational axis thereof, the abutment of the support rotating at greater angular velocity being spaced from said axis by a greater distance than the abutment of the other support, to enable resilient engagement of said abutments in the transfer position of the supports.

6. Stacking and reversing apparatus as claimed in claim 5, said abutments consisting of resilient metal strips extending edgewise from said supports and having their free edges angularly bent towards said axis.

7. Stacking and reversing apparatus as claimed in claim 1, wherein said racks have an equal diameter and the diameter of said first pinion exceeds the diameter of said second pinion.

8. Stacking and reversing apparatus as claimed in claim 1, wherein said transfer position corresponds to a rotation angle of said first support of 105° and a rotation angle of said second support of 75°, respectively.

References Cited

UNITED STATES PATENTS

| | | |
|---|---|---|
| 1,341,798 | 6/1920 | Graham. |
| 1,506,047 | 8/1924 | Bryan et al. |
| 2,271,213 | 1/1942 | Weidner et al. |
| 2,346,293 | 4/1944 | Croy. |
| 2,527,024 | 10/1950 | Mitchell. |
| 2,829,759 | 4/1958 | Parker. |
| 2,981,420 | 4/1961 | Johanson. |
| 3,039,626 | 6/1962 | Schreiner et al. |
| 3,154,298 | 10/1964 | Amadieu. |
| 3,307,715 | 3/1967 | Gott et al. |
| 3,313,394 | 4/1967 | Mills et al. _____ 214—6 X |

GERALD M. FORLENZA, Primary Examiner

ROBERT J. SPAR, Assistant Examiner

U.S. Cl. X.R.

214—1